(12) United States Patent
Hausmann et al.

(10) Patent No.: US 8,375,737 B2
(45) Date of Patent: Feb. 19, 2013

(54) ICE MAKER AND DOMESTIC APPLIANCE WHICH IS EQUIPPED WITH SAID ICE MAKER

(75) Inventors: Georg Hausmann, Dillingen (DE); Peter Nalbach, Kirchheim/Nabern (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 683 days.

(21) Appl. No.: 12/085,072

(22) PCT Filed: Oct. 17, 2006

(86) PCT No.: PCT/EP2006/067496
§ 371 (c)(1),
(2), (4) Date: May 15, 2008

(87) PCT Pub. No.: WO2007/062908
PCT Pub. Date: Jun. 7, 2007

(65) Prior Publication Data
US 2009/0249814 A1    Oct. 8, 2009

(30) Foreign Application Priority Data
Nov. 30, 2005 (DE) .......................... 10 2005 057 139

(51) Int. Cl.
*F25C 1/22* (2006.01)
(52) U.S. Cl. ............... 62/340; 62/125; 62/126; 62/127; 62/129; 62/130; 62/131; 62/317; 62/318; 62/341; 62/342; 62/343; 62/344; 62/345; 62/346; 62/347; 62/348; 62/349; 62/350; 62/351; 62/352; 62/353; 62/354; 62/355; 62/356; 62/128; 141/83; 141/95

(58) Field of Classification Search ............ 62/125–131, 62/317–318, 340–356; 141/83, 95
See application file for complete search history.

(56) References Cited

U.S. PATENT DOCUMENTS

| | | | | |
|---|---|---|---|---|
| 4,792,345 A * | 12/1988 | Abe et al. | ......................... | 96/397 |
| 6,306,290 B1 * | 10/2001 | Rolfes | .............. | 210/85 |
| 6,355,177 B2 | 3/2002 | Senner et al. | | |
| 6,375,834 B1 | 4/2002 | Guess et al. | | |
| 6,613,236 B1 | 9/2003 | Guess et al. | | |
| 7,281,386 B2 * | 10/2007 | McDougal et al. | ............... | 62/74 |
| 2001/0023843 A1 | 9/2001 | Senner et al. | | |
| 2002/0189983 A1 | 12/2002 | Guess et al. | | |
| 2005/0257536 A1 * | 11/2005 | Chung et al. | .................... | 62/135 |
| 2006/0277928 A1 | 12/2006 | McDougal et al. | | |
| 2008/0041073 A1 * | 2/2008 | Ferragut et al. | ................. | 62/129 |

OTHER PUBLICATIONS

International Search Report PCT/EP2006/067496.

* cited by examiner

*Primary Examiner* — Cheryl J Tyler
*Assistant Examiner* — Jonathan Koagel
(74) *Attorney, Agent, or Firm* — James E. Howard; Andre Pallapies

(57) ABSTRACT

An ice maker for a domestic appliance comprises an ice tray, a water feed line which can be used to fill the ice tray with water, a water filter which is arranged in the water feed line such that it can be replaced, and a monitoring unit for calculating a value which is representative of the degree of wear of the filter. The monitoring unit has means for changing the representative value by a first fixed step width each time the ice tray is filled.

4 Claims, 1 Drawing Sheet

ICE MAKER AND DOMESTIC APPLIANCE WHICH IS EQUIPPED WITH SAID ICE MAKER

BACKGROUND OF THE INVENTION

The present invention relates to an ice maker and to a domestic appliance, in particular a refrigeration device, which is equipped with such an ice maker.

In many countries chlorine is added to the tap water in order to prevent bacterial contamination, or for other reasons the tap water has a taste perceived by the consumer as unpleasant. In such countries the water provided for making ice cubes for drinks or prepared in some other way for immediate human consumption is generally filtered, e.g. with the aid of an active carbon filter, in order to remove the chlorine or more generally the carrier substances of the undesirable taste or smell. Filters of this kind have a limited lifespan; once this has been exceeded, it is no longer guaranteed that the undesirable substances will be eliminated, and instead of trapping germs, the filter itself can become a breeding ground for germs. It is therefore important both for the convenience and for the health of consumers that the lifecycle of the filters is monitored and that provision is made to replace them when necessary.

Refrigeration devices in which a water filter is connected upstream of an integrated ice maker or a dispenser for chilled water are known e.g. from U.S. Pat. No. 6,355,177 B2 and U.S. Pat. No. 6,375,834 B1. With these known devices, provision is also made for monitoring the degree of wear of the filter. U.S. Pat. No. 6,355,177 B2 proposes recording the accumulated time that a valve disposed in a supply conduit of ice maker and dispenser remains open, based on a known flow rate of said valve. This accumulated time is multiplied by the flow rate of the valve in order to obtain an accumulated throughput of the filter, and said throughput is compared with a specified throughput in order to estimate whether the filter is worn out or not. Processing of this kind requires an exact time measurement and a plurality of multiplications in order to assess the degree of wear of the filter.

In the refrigeration device known from U.S. Pat. No. 6,613,236 B1, a processor executes an endless loop in which checks are made at regular intervals to determine whether a supply valve in a water supply conduit is open or not. If the valve is open, a water counter is incremented by a value corresponding to the water throughput of the valve between two repetitions of the endless loop.

This system likewise assumes that the flow rate of the open valve is essentially constant, and the duration of a loop of the program must also be essentially constant. A microprocessor which executes the program must therefore execute it continuously, or at least at high priority compared to other programs that are to be executed, in order to guarantee a constant time interval between two repetitions. The monitoring of the filter therefore imposes a considerable load on the processing capacity of the microprocessor.

BRIEF SUMMARY OF THE INVENTION

The object of the present invention is to create an ice maker and a domestic refrigeration appliance equipped therewith in which the monitoring of the degree of wear of a water filter connected upstream of the ice maker imposes only a small load on the processing capacity of a monitoring unit deployed therefor.

The object is achieved firstly by means of an ice maker having an ice tray, a water supply conduit via which the ice tray can be filled with water, a water filter disposed in a replaceable manner in the water supply conduit, and a monitoring unit for calculating a value representative of the degree of wear of the filter, which monitoring unit has means for changing the representative value by a first fixed increment each time the ice tray is filled. Since the volume of water that the ice tray of an ice maker holds is always the same, it is sufficient simply to record the number of times the ice tray is filled in order thereby to obtain a measure for the accumulated water throughput of an upstream-connected filter and consequently for the latter's degree of wear.

The ice tray can be assigned a fill-level meter which initiates the closing of a valve disposed in the water supply conduit each time a predefined filling level of the ice tray is reached. In this way it is ensured that a fixed volume of water is supplied to the ice tray each time the ice tray is filled, irrespective of possible pressure fluctuations in the water supply conduit or other imponderables.

Alternatively, a valve disposed in the water supply conduit can be assigned a timer which closes the valve again in each case after it has been open for a predefined period of time. This time period is defined as a function of the flow rate of the valve in such a way that the volume of water that has flowed through the valve in the time period corresponds to the volumetric capacity of the ice tray and remains essentially the same from one time to the next.

The object is also achieved by a domestic refrigeration appliance which has an ice maker as described above.

A domestic refrigeration appliance of said kind can also have a water dispenser likewise supplied via the filter. In this case the monitoring unit can have means which change the representative value by a second fixed increment at fixed time intervals while a valve of the dispenser is open.

This second fixed increment is preferably smaller than the first so that drawn-off volumes of water that are smaller than the filling capacity of the ice tray can also be recorded.

The time interval between two changes in the representative value by the second increment with the valve open is preferably about twice as long as the time interval between the opening of the valve and the first subsequent change by the second increment. If the value were to be changed by the second increment immediately upon the valve of the dispenser being opened, this would correspond to an immediate increase in the volume of water represented by the representative value already at the time the valve is opened, irrespective of whether this volume of water is then actually drawn off or not. The representative value obtained in this way would be systematically too large. If, conversely, the same time period as between two successive changes were to have to elapse from the opening of the valve to the first change in the representative value by the second increment, the accumulated water throughput recorded would be systematically too low. If one assumes that the drawn-off volumes of water are statistically uniformly distributed, then a correct estimation of the overall water throughput results if the time interval between the opening of the valve and the first change in the representative value is half as long as that between two successive changes.

BRIEF DESCRIPTION OF THE DRAWINGS

Further features and advantages of the invention will emerge from the following description of exemplary embodiments with reference to the attached figures, in which.

DETAILED DESCRIPTION OF THE PRESENT INVENTION

Figure 1:
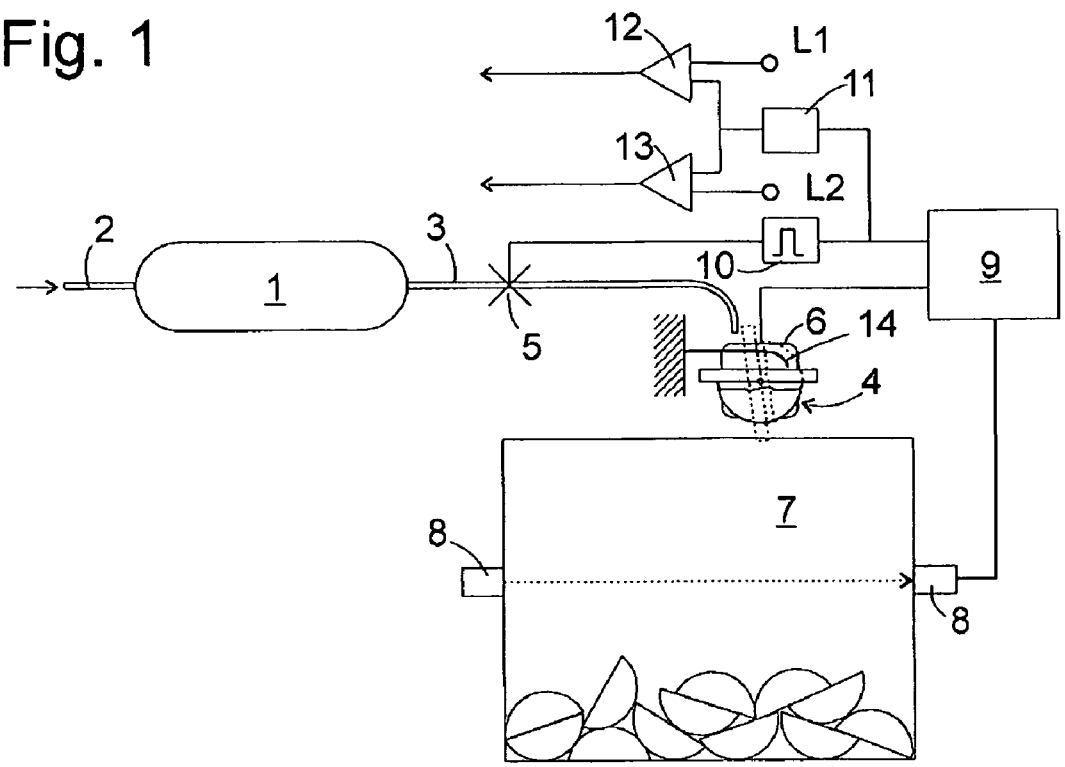
FIG. 1 is a schematic representation of an ice maker according to a first embodiment of the invention.

FIG. 1 is a schematic representation of an ice maker integrated in a refrigerator. A replaceable water filter 1 is housed in a base area of the refrigerator. An input port of the filter 1 is connected via a conduit 2 to a building water supply conduit. A conduit 3 leads from an output port of the water filter 1 to an ice tray 4. A valve 5 is shown in the conduit 3. Alternatively said valve could also be disposed in the conduit 2 so that when in the closed state it can insulate the water filter 1 from the pressure of the building water supply conduit.

The ice tray 4 has the form of a cylinder segment whose longitudinal axis extends at right angles to the drawing plane of FIG. 1 and which is subdivided into a plurality of compartments by means of dividers oriented at right angles to the longitudinal axis. The ice tray 4 can pivot about the longitudinal axis with the aid of a motor 6. The position of the ice tray 4 represented by means of continuous lines in the figure is a freezing position in which the dividers project above the water level in the compartments of the ice tray so that pieces of ice that are separated from one another are obtained. Furthermore the tray can sometimes assume a slightly inclined equalization position in which water that is poured in spills over the dividers over a part of the tray's width so that it is possible to balance out the water level between the compartments. In a sharply inclined position, shown as a dashed outline in the figure, the prepared pieces of ice are pushed out of the tray 4 by means of fingers 14 mounted above the tray 4 and fall into a storage container 7 located thereunder, from which they can be removed by a user as necessary.

Disposed on the storage container 7 is a photoelectric sensor 8 or a similar type of fill-level sensor which serves for signaling an insufficient fill level of the storage container 7 to a control circuit 9. If this happens, the control circuit 9 emits a pulse to a monostable multivibrator 10 and a counter 11. The multivibrator 10 thereupon delivers a pulse of a fixed, manufacturer-set duration to the valve 5. While the pulse is applied, the valve 5 stays open and water flows through the filter 1 and the conduit 3 into the ice tray 4. The duration of the output pulse from the multivibrator 10 is dimensioned as a function of a specified flow rate of the valve 5 in such a way that a volume of water sufficient to fill the compartments of the ice tray 4 is delivered.

After the ice tray 4 has been filled, the control circuit 9 initially pivots the ice tray 4 briefly into the equalization position and then back into the position shown. The ice tray 4 remains in this position for a period of time preset at the control circuit 9 and sufficient to freeze the water in the tray 4. The prepared pieces of ice are subsequently ejected, and if the photoelectric sensor 8 continues to signal an insufficient fill level, the process is repeated.

The counter 11 is incremented by a fixed increment by each pulse output by the control circuit 9. In the case considered here of a refrigerator which has only an ice maker, but no dispenser for chilled water, the increment can be equal to one. Then the contents of the counter 11 denote the number of times that the ice tray 4 has already been filled. Since the fill volume of the ice tray 4 is always the same, this counter value is a direct measure for the overall throughput of the filter 1. Comparators 12, 13 are connected to the output of the counter 11 for the purpose of comparing the counter value with two limit values L1, L2. If the counter value exceeds the smaller of the two limit values, L1, the comparator 12 supplies an output signal which activates a display (not shown) on the housing of the refrigerator in order to alert a user to the fact that the capacity of the water filter 1 is almost exhausted and that a replacement for the filter should be procured. If the counter value also exceeds the greater limit value L2, the comparator 13 supplies a second signal which is displayed on the housing of the refrigerator in order to alert the user to the fact that the capacity of the filter is exhausted.

Figure 2:
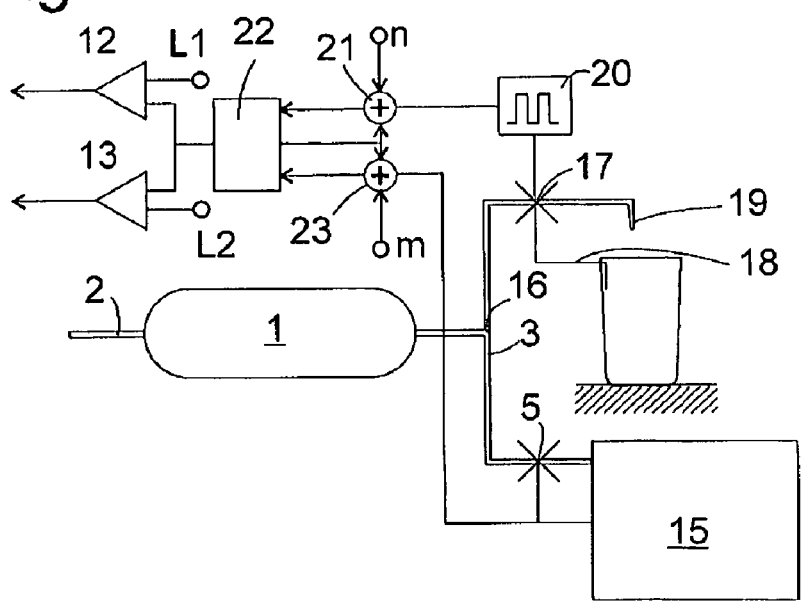
FIG. 2 is a schematic representation of a combined arrangement of water dispenser and ice maker.

FIG. 2 is a schematic representation of an ice maker and a dispenser for chilled drinking water in a domestic refrigeration appliance according to the invention. The ice maker has the same components 4, 6 to 10 as described above with reference to FIG. 1; in FIG. 2 they are summarized as a block 15. A branch 16 is formed in the conduit 3 between the water filter 1 and the valve 5 of the ice maker, said branch 16 supplying a dispenser 19 via a second valve 17. The valve 17 is controlled in a manner known per se by means of a lever 18 which is actuated by placing a beaker or similar at the dispenser 19. Opening the valve 17 causes an oscillator 20 to be activated which supplies a square wave signal in which low and high signal levels alternate in each case with the same duration t.

For the purposes of the present description it is assumed that the oscillator 20, after being activated by the valve 17, initially supplies a low level with the duration t. This specification is purely arbitrary, however; the depicted system's principle of operation as described below can of course also be implemented in an equivalent manner if the oscillator 20 initially supplies a high signal level.

A rising edge of the signal from the oscillator 20, in a time interval t after the opening of the valve 17, triggers an adder 21 at the two data inputs of which a fixed integer value n or the current contents of a register 22 are present. The output of the adder 21 is connected to an input of the register 22 in order to write back the register contents incremented by n into the register 22.

The adder 21 is triggered by each further rising edge of the oscillator signal, with the result that the register is incremented at times t, 3t, 5t, etc. while the valve 17 is open.

A second adder 23 receives a trigger signal from the ice maker block 15 which, as shown in the figure, can be the same signal which also controls the valve 5, but which could also be the input signal of the multivibrator 10. The inputs of the adder 23 are connected to the contents of the register 22 or a fixed value m; the output of the adder 23 is in turn connected to an input of the register 22 for the purpose of writing back the register contents incremented by m into the register 22.

The contents of the register 22, like those of the counter 11 in FIG. 1, are a measure for the accumulated water throughput of the filter 1 and are processed further by comparators 12, 13 in the same way as described with reference to FIG. 1.

The ratio of the increment values n/m is chosen according to the ratio of the water throughput of the valve 17 in the time period 2t to the filling capacity of the ice tray 4. If e.g. the capacity of the ice tray is 0.2 l and m=5, each increase in the register contents 22 by 1 corresponds to a water throughput of the filter 1 of 40 cm$^3$. Given an exemplarily assumed flow rate of the valve 17 of 240 cm$^3$/minute, the register 22 would consequently have to be incremented at a speed of 6/minute when the valve 17 is open. In other words, n=1 and t=5 seconds can be set for example.

The elements such as, say, register, adder, counter, comparators etc. described as discrete circuit components with reference to FIGS. 1 and 2 can, of course, also be implemented by means of a program-controlled circuit. A program-controlled circuit of this kind would actually be required for monitoring the water throughput through the filter 1 only at times when a valve 5 or 17 is open; during by far the major proportion of the operating time of the refrigeration appliance it can be available without restriction for other tasks.

The invention claimed is:

1. An ice maker comprising:
an ice tray;
a water supply conduit for filling the ice tray with water;
an apparatus for discharging ice from the ice tray into an ice bin;
a water filter disposed in a replaceable manner in the water supply conduit; and
a monitoring unit for determining a value representative of a degree of wear of the filter, the monitoring unit including;
an event counter for counting each tray of ice that enters the ice bin;
a trip element operatively associated with the ice bin for signaling the counter whenever ice enters the ice bin and the bin is not filled to a predetermined level;
an arrangement for receiving a signal from the counter and determining a value representative of a degree of wear of the filter based on the number of trays of ice produced.

2. The ice maker as claimed in claim 1, wherein the ice tray includes a fill-level meter.

3. The ice maker as claimed in claim 1, further including a valve disposed in the water conduit; and a timer for closing the valve after the valve has been open for a predetermined period of time.

4. A domestic refrigeration appliance comprising:
an ice maker, the ice maker including an ice tray;
a water supply conduit for filling the ice tray with water;
an apparatus for discharging ice from the ice tray into an ice bin;
a water filter disposed in a replaceable manner in the water supply conduit;
a water dispenser having water supplied to it via the filter;
a water dispenser valve disposed in the water conduit and operatively associated with the water dispenser; and
a monitoring unit for determining a value representative of a degree of wear of the filter, the monitoring unit including;
an event counter;
a trip element in operational communication with the ice bin for signaling the event counter whenever ice enters the ice bin from the ice tray and the bin is not filled to a predetermined level;
a device in operational communication with the event counter for monitoring the duration of each opening of the water dispenser valve, and generating an event count of at least one event based on the duration of each opening of the water dispenser valve; and
an arrangement for receiving a signal from the event counter and determining a value representative of a degree of wear of the filter based on the number of trays of ice that enter the bin and the total number of water dispenser valve events.

\* \* \* \* \*

UNITED STATES PATENT AND TRADEMARK OFFICE
CERTIFICATE OF CORRECTION

PATENT NO. : 8,375,737 B2  Page 1 of 1
APPLICATION NO. : 12/085072
DATED : February 19, 2013
INVENTOR(S) : Hausmann et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 781 days.

Signed and Sealed this

First Day of September, 2015

Michelle K. Lee
*Director of the United States Patent and Trademark Office*